(12) United States Patent
Wang et al.

(10) Patent No.: US 11,889,493 B2
(45) Date of Patent: *Jan. 30, 2024

(54) METHOD AND APPARATUS FOR UPLINK TRANSMISSIONS

(71) Applicant: Pantech Wireless, LLC, Cedar Park, TX (US)

(72) Inventors: Jin Wang, Princeton, NJ (US); Arty Chandra, Roslyn, NY (US); John S. Chen, Ann Arbor Township, MI (US); Mohammed Sammour, Amman (JO); Stephen E. Terry, Northport, NY (US)

(73) Assignee: Pantech Wireless, LLC, Cedar Park, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/131,184

(22) Filed: Dec. 22, 2020

(65) Prior Publication Data

US 2021/0112570 A1    Apr. 15, 2021

Related U.S. Application Data

(63) Continuation of application No. 13/424,906, filed on Mar. 20, 2012, now Pat. No. 11,172,493, which is a
(Continued)

(51) Int. Cl.
*H04W 72/04*    (2023.01)
*H04W 72/121*    (2023.01)
(Continued)

(52) U.S. Cl.
CPC .......... *H04W 72/121* (2013.01); *H04W 72/23* (2023.01); *H04W 72/542* (2023.01)

(58) Field of Classification Search
None
See application file for complete search history.

(56) References Cited

U.S. PATENT DOCUMENTS

| 5,299,198 A | 3/1994 | Kay et al. |
| 5,682,387 A | 10/1997 | Satoh |

(Continued)

FOREIGN PATENT DOCUMENTS

| EP | 1206072 | 5/2002 |
| EP | 1392074 | 2/2004 |

(Continued)

OTHER PUBLICATIONS

Nokia, "Signalling Control Overhead due to Scheduling", 3GPP TSG-RAN WG2 Ad-hoc on LTE, R2-061976, Cannes, France, Jun. 27-30, 2006, 4 pages.

(Continued)

*Primary Examiner* — Gregory B Sefcheck
(74) *Attorney, Agent, or Firm* — Volpe Koenig

(57) ABSTRACT

A method and a wireless transmit/receive unit (WTRU) are disclosed. The WTRU comprises a transceiver and a processor. The WTRU receives a radio resource control (RRC) message, wherein the RRC message indicates a resource block, the resource block including a plurality of locations indicating time-frequency orthogonal frequency division multiplex (OFDM) resource assignments for a plurality of WTRUs including the WTRU. The WTRU analyzes assignment messages for a subset of the plurality of locations within the indicated resource block, and transmits an uplink signal based on one or more of the analyzed assignment messages that are for the WTRU.

10 Claims, 5 Drawing Sheets

Related U.S. Application Data continuation of application No. 11/840,534, filed on Aug. 17, 2007, now Pat. No. 8,165,594.

(60) Provisional application No. 60/839,022, filed on Aug. 21, 2006.

(51) Int. Cl.
    *H04W 72/23* (2023.01)
    *H04W 72/542* (2023.01)

(56) References Cited

U.S. PATENT DOCUMENTS

| | | | |
|---|---|---|---|
| 5,734,639 A | 3/1998 | Bustamante et al. | |
| 5,745,854 A | 4/1998 | Schorman | |
| 5,956,318 A * | 9/1999 | Saeki | H04L 27/2613 370/480 |
| 6,330,440 B1 | 12/2001 | Ban et al. | |
| 6,456,850 B1 | 9/2002 | Kim et al. | |
| 6,487,183 B1 | 11/2002 | Lo et al. | |
| 6,600,917 B1 * | 7/2003 | Maupin | H04W 48/16 455/414.1 |
| 6,643,262 B1 | 11/2003 | Larsson et al. | |
| 6,728,257 B1 | 4/2004 | Bharghavan et al. | |
| 6,928,057 B2 | 8/2005 | Bullman et al. | |
| 7,027,415 B1 | 4/2006 | Dahlby et al. | |
| 7,130,610 B2 | 10/2006 | Dolezal et al. | |
| 7,349,338 B2 | 3/2008 | Balachandran et al. | |
| 7,385,959 B1 * | 6/2008 | Loc | H04L 1/0026 455/574 |
| 7,408,913 B2 | 8/2008 | Khan | |
| 7,450,933 B2 * | 11/2008 | Kwak | H04W 68/00 455/414.1 |
| 7,672,312 B1 | 3/2010 | Hurtta | |
| 8,112,091 B2 * | 2/2012 | Chun | H04W 72/042 455/452.2 |
| 8,644,250 B2 * | 2/2014 | Chun | H04W 74/0833 370/278 |
| 9,253,801 B2 * | 2/2016 | Chun | H04W 74/0833 |
| 9,955,507 B2 * | 4/2018 | Chun | H04W 74/0833 |
| 10,159,071 B2 * | 12/2018 | Park | H04L 5/0091 |
| 2001/0053971 A1 | 12/2001 | Demetrescu et al. | |
| 2003/0220119 A1 | 11/2003 | Terry | |
| 2004/0001429 A1 | 1/2004 | Ma et al. | |
| 2004/0116143 A1 | 6/2004 | Love et al. | |
| 2004/0127221 A1 | 7/2004 | Takano et al. | |
| 2004/0179689 A1 | 9/2004 | Maggenti et al. | |
| 2004/0208183 A1 | 10/2004 | Balachandran et al. | |
| 2004/0228287 A1 | 11/2004 | Seol et al. | |
| 2005/0002345 A1 | 1/2005 | Pyo et al. | |
| 2005/0124371 A1 | 6/2005 | Harris et al. | |
| 2005/0169203 A1 | 8/2005 | Sinnarajah et al. | |
| 2005/0181815 A1 | 8/2005 | Shostak | |
| 2005/0201325 A1 | 9/2005 | Kang et al. | |
| 2005/0233732 A1 * | 10/2005 | Kwak | H04H 60/91 455/414.1 |
| 2005/0250534 A1 | 11/2005 | Maurer | |
| 2005/0265311 A1 | 12/2005 | Kuure et al. | |
| 2005/0265373 A1 | 12/2005 | Khan | |
| 2005/0286467 A1 | 12/2005 | Chang | |
| 2006/0018393 A1 * | 1/2006 | Gore | H04L 5/0048 375/340 |
| 2006/0058034 A1 | 3/2006 | Vaittinen et al. | |
| 2006/0104228 A1 | 5/2006 | Zhou et al. | |
| 2006/0104348 A1 * | 5/2006 | Chen | H04H 40/18 375/240.01 |
| 2006/0203738 A1 | 9/2006 | Fok et al. | |
| 2007/0058585 A1 | 3/2007 | Mudigonda et al. | |
| 2007/0115915 A1 | 5/2007 | Sheng et al. | |
| 2007/0117569 A1 | 5/2007 | Ovadia et al. | |
| 2007/0230412 A1 | 10/2007 | McBeath et al. | |
| 2007/0263591 A1 | 11/2007 | Diachina et al. | |
| 2008/0004029 A1 | 1/2008 | Moilanen | |
| 2008/0014937 A1 | 1/2008 | Laroia et al. | |
| 2008/0020778 A1 * | 1/2008 | Pi | H04W 72/30 455/450 |
| 2008/0025337 A1 | 1/2008 | Smith et al. | |
| 2008/0026744 A1 * | 1/2008 | Frederiksen | H04L 1/0026 455/425 |
| 2008/0049692 A1 | 2/2008 | Bachu et al. | |
| 2008/0062944 A1 | 3/2008 | Smith et al. | |
| 2008/0076432 A1 | 3/2008 | Senarath et al. | |
| 2008/0144600 A1 | 6/2008 | Anderson | |
| 2008/0188247 A1 | 8/2008 | Worrall | |
| 2008/0268844 A1 | 10/2008 | Ma et al. | |
| 2008/0287132 A1 | 11/2008 | Torsner et al. | |
| 2008/0305819 A1 * | 12/2008 | Chun | H04W 72/042 455/509 |
| 2008/0310363 A1 * | 12/2008 | McBeath | H04W 72/042 370/344 |
| 2008/0310528 A1 | 12/2008 | Soong et al. | |
| 2009/0011718 A1 * | 1/2009 | Chun | H04W 74/0833 455/70 |
| 2009/0022098 A1 * | 1/2009 | Novak | H04L 1/1867 370/329 |
| 2009/0220022 A1 * | 9/2009 | Eberlein | H04B 7/18523 375/267 |
| 2009/0303918 A1 * | 12/2009 | Ma | H04L 5/0035 370/329 |
| 2010/0136987 A1 | 6/2010 | Kim et al. | |

FOREIGN PATENT DOCUMENTS

| | | |
|---|---|---|
| WO | 98/04055 | 1/1998 |
| WO | 2005/119941 | 12/2005 |

OTHER PUBLICATIONS

Motorola, "VoIP Group Scheduling", 3GPP TSG RAN WG1#44, R1-060398 Denver, USA, Feb. 13-17, 2006, 3 pages.

Motorola, "Scheduling for Voice", 3GPP TSG RAN WG2 LTE AdHoc, Cannes, France R2-061994, Jun. 27-30, 2006, 11 pages.

Motorola, "Control Signalling Considerations", 3GPP TSG-RAN WG2 LTE Ad Hoc, K-061995, Cannes, France, Jun. 27-30, 2006, 6 pages.

Intel, "Overcoming Barriers to High-Quality Voice over IP Deployments", Intel in Communications, Whitepaper, 2003, 11 pages.

China Unicom et al., "Joint Proposal for 3GPP2 Physical Layer for FDD Spectra", C30-20060731-040R4_HKLLMNQRSUZ_PP2Phase2_FDD_Proposal, Jul. 31, 2006, 83 pages.

"United States Office Action", U.S. Appl. No. 11/840,534, dated Dec. 9, 2010, 42 pages.

"United States Office Action", U.S. Appl. No. 11/840,534, dated Jun. 18, 2010, 47 pages.

"Taiwanese Office Action", Taiwanese Application No. 96130635, dated May 19, 2014, 9 pages.

"Scheduling for Voice; Agenda Item 8.1; Document for: Discussion and Decision", 3GPP TSG RAN WG1 LTE AdHoc, R1-061734, Cannes, Jun. 27-30, 2006, 11 pages.

"3rd Generation Partnership Project; Technical Specification Group Radio Access Network; Feasibility Study for Evolved UTRA and UTRAN (Release 7)", 3GPP TR 25.912 0.1.7, Jun. 2006, 64 pages.

"3rd Generation Partnership Project; Technical Specification Group Radio Access Network; Physical Layer Aspects for Evolved UTRA (Release 7)", 3GPP TR 25.814 V2.0.0, Jun. 2006, 125 pages.

"3rd Generation Partnership Project, Technical Specification Group Radio Access Network; Physical Layer Aspects for Evolved Universal Terrestrial Radio Access (UTRA) (Release 7)", 3GPP TR 25.814 V7.0.0, Jun. 2006, 126 pages.

Third Generation Partnership Project; Technical Specification Group Radio Access Network; Multiplexing and channel coding (Release 8), 3GPP TS 36.212 V1.3.0 (Jul. 2007).

Third Generation Partnership Project; Technical Specification Group Radio Access Network; Physical layer procedures (Release 8), 3GPP TS 36.213 V1.2.0 (May 2007).

Third Generation Partnership Project; Technical Specification Group Radio Access Network; Multiplexing and channel coding (FDD) (Release 7), 3GPP TS 25.212 V7.1.0 (Jun. 2006).

(56) References Cited

OTHER PUBLICATIONS

Third Generation Partnership Project; Technical Specification Group Radio Access Network; Multiplexing and channel coding (FDD) (Release 7), 3GPP TS 25.212 V7.5.0 (May 2007).

* cited by examiner

METHOD AND APPARATUS FOR UPLINK TRANSMISSIONS

CROSS REFERENCE TO RELATED APPLICATIONS

This application is a continuation of U.S. patent application Ser. No. 13/424,906, filed Mar. 20, 2012, which issued on Nov. 9, 2021 as U.S. Pat. No. 11,172,493, which is a continuation of U.S. patent application Ser. No. 11/840,534, filed Aug. 17, 2007, which issued on Apr. 24, 2012 as U.S. Pat. No. 8,165,594, which claims the benefit of U.S. Provisional Application No. 60/839,022, filed Aug. 21, 2006, which are incorporated by reference as if fully set forth. This application is related to co-pending U.S. patent application Ser. No. 17/131,145, filed Dec. 22, 2020.

FIELD OF INVENTION

The present invention is related to the status reporting, resource allocation, scheduling, and signaling for grouping real time services (RTS) in a long term evolution (LTE) or high speed packet service (HSPA) system. In particular, the present invention relates to resource allocation and signaling methods at the medium access control (MAC) and physical (PHY) layers to efficiently make the scheduling decision, by fully utilizing the voice silent and active behavior when voice over Internet Protocol (VoIP) users are supported on a packet switched basis in LTE or HSPA.

BACKGROUND

The objective of Evolved UTRA and UTRAN is to develop a radio access network towards a high data rate, low latency, packet optimized system with improved system capacity and coverage. In order to achieve this objective, an evolution of the radio interface as well as the radio network architecture should be considered. For example, instead of using code division multiple access (CDMA) which is currently used in 3GPP, orthogonal frequency division multiple access (OFDMA) and frequency division multiple access (FDMA) are proposed air interface technologies to be used in the downlink and uplink transmissions respectively. One change is that all packet switched service in LTE, which means all the voice calls, will be made on a packet switched basis. This leads to many challenges in the LTE system design to support VoIP service.

While VoIP users can utilize the same benefit of advanced link adaptation and statistical multiplexing techniques that are used in the LTE system as data users, the greatly increased number of users that may be served by the system because of the smaller voice packet sizes can place a significant burden on the control and feedback mechanisms of the LTE system. The existing resource allocation and feedback mechanisms are typically not designed to deal with a large peak-to-average number of allocations, as found with VoIP users on the system.

Traditional cellular voice traffic has some distinguishing attributes, such as vocoder output at fixed intervals, well-defined maximum and minimum rates (output can be comfort noise, full rate, sub-rate, etc.), and traffic with a fractional voice activity factor (VAF) of approximately 35-50%. The VAF is a percentage of time that a user is speaking. It is desirable to exploit these attributes to schedule a large number of voice users with minimal resources for control signaling both for resource assignment and feedback.

Grouping users in similar radio conditions has been proposed by the prior art to reduce the amount of signaling and feedback required to support voice traffic in LTE. It was proposed that groups be associated with particular sub-frames to exploit the known traffic characteristics and thus allow for statistical multiplexing based on the VAF and retransmission requirements.

According to one prior art proposal, the network can exploit the VAF to overload the group with a user population larger than what a typical sub-frame would be able to support for the voice packets. For example, at 5 MHz it is expected that three or four users can be supported for voice services in a 0.5 ms sub-frame. With a typical VAF of 0.4, it should be possible to define a group of eight to ten users.

This general grouping principle is shown in FIG. 1, with users grouped based on their channel conditions. The rationale is that users in similar channel conditions would be supported with similar channel attributes such as modulation, coding rate, etc. FIG. 2 shows how to use a bitmap to assign radio resource blocks within a group of user equipments (UEs). Note that the group scheduling is a type of persistent scheduling with fast on/off control, which uses the preconfigured assignment of a smaller group of UEs to a sub-frame to reduce the number of addressable UEs in that sub-frame. As shown in FIG. 2, in a first sub-frame, radio resources are allocated to UE1, UE2, UE7, UE8, and UE9. If UE2 acknowledges a previous transmission and no longer needs the radio resource, that resource is free to be reassigned. In a second sub-frame, radio resources are allocated to UE1, UE3, UE7, UE8, and UE9.

The following problems are identified from the LTE system and existing proposals:

1. Detailed signaling options for grouping services are missing from current proposals.

2. The radio resources are allocated to the voice users on a semi-static basis. Due to the voice silent and active state transition, it is efficient to allocate the radio resources of a voice user to other users or services if that voice user is in the silent period. The Evolved UTRA Node B (eNB) can monitor the voice activity to all UEs to be transmitted in the downlink (DL) easily and make an efficient resource assignment and signal that decision to the UEs. If an eNB needs to re-allocate radio resources that are assigned to a UE for uplink (UL) voice service to other services or other UEs, there is a problem if this UE is in the voice silent period because the eNB cannot monitor the UL UE's voice activity and thus cannot make the efficient UL resource scheduling decision.

3. The channel condition is varying continuously and the radio resource block assigned to each UE for voice service cannot be in a fixed pattern, otherwise it will lead to performance degradation. Performance degradation can include, for example, a lost voice packet due to the deep fading channel if the assigned radio resource is fixed during the entire VoIP service. Consecutive lost voice packets can distort the reception by the listener, which can result in an unacceptable level of service. For example, when UE grouping is used, the radio resources assigned to UEs within a VoIP group cannot be in a fixed order. Some methods need to be proposed to change the resource allocation pattern and with relevant signaling to support the resource permutation.

4. If the UE grouping method is used for VoIP service to efficiently use the radio resources by utilizing the voice on-off activity to reduce the overhead, there will be a problem if the number of UEs within a group is too small. Considering the VAF, which is between 35-50%, if only ten voice users are grouped together as proposed in the prior art in one 0.5 ms sub-frame, it is not statistically correct that there are always less than or equal to four active users and six inactive users within one group. The system will have to assign new radio resources to UEs within a group if there are more UEs than available resources, which will cause extra overhead.

By considering the VAF, the grouping method can be used appropriately only if a large number of UEs are grouped together, so that it can be assumed that statistically there are around 35-50% active voice users and the rest are inactive voice users. So either more than ten UEs have to be grouped together or some resource scheduling methods have to be proposed. Also, having the same number of UEs within one group is not flexible to reflect channel and voice traffic volume.

SUMMARY

The present invention is a method and apparatus for resource allocation signaling for grouping user real time services. Uplink signaling for voice activity reporting of each user's transition between an active state and an inactive voice state is sent from a wireless transmit/receive unit to a Node B. Radio resource allocation to users of a wireless communication system varies based on user measurement reporting, a pre-determined pattern such as frequency hopping, or a pseudorandom function. Grouping methods are adjusted to better utilize the voice activity factor, so that statistical multiplexing can be used to more efficiently utilize physical resources.

BRIEF DESCRIPTION OF THE DRAWING(S)

A more detailed understanding of the invention may be had from the following description of a preferred embodiment, given by way of example and to be understood in conjunction with the accompanying drawings wherein.

DETAILED DESCRIPTION OF THE PREFERRED EMBODIMENT(S)

Hereafter, the term "wireless transmit/receive unit" (WTRU) includes, but is not limited to, a user equipment, a mobile station, a fixed or mobile subscriber unit, a pager, or any other type of device capable of operating in a wireless environment. When referred to hereafter, the term "base station" includes, but is not limited to, a Node B, an eNB, a site controller, an access point, or any other type of interfacing device in a wireless environment.

Although the embodiments of the present invention are described in reference to LTE as a specific example, another applicable example includes HSPA systems when similar services are supported. Although VoIP operation is presented as one specific example, the embodiments of the present invention may also support any intermittent transmitting applications.

Signaling for Grouping Services

In a first embodiment of the present invention, signaling for grouping services is proposed. In signaling for grouping services, it is preferable that the radio resource block allocation for WTRUs within one group be included in the L1 common control channel. The number of bits to signal the radio resource block assignment is dependent on how many radio bearers (RBs) will be used for assignment. For example, if 16 RBs are assigned, then four bits are required for signaling purposes.

During group configuration, a set of common control resources is assigned and signaled explicitly or implicitly to the WTRUs for grouping purposes. From the common control channel, the WTRU is signaled the position of the bitmap, the list of assigned RBs, and HARQ process information if it is not sent in the common control channel. There are three options for using the common control channel to signal the grouping of WTRUs:

a) only include the WTRU ID and RB assignment information;
b) include the WTRU ID, RB assignment information, and HARQ process information; or
c) only include RB assignment information and HARQ process information.

Besides using the L1 control channel to signal the WTRU grouping, another option is to signal the grouping through a radio resource control (RRC) configuration message. The RRC configuration message includes the location of the following contents: the resource assignment bitmap, the RB assignment, and the HARQ process information, as well as other necessary information. The position of a particular WTRU inside the bitmap is also signaled, so that the WTRU knows which bit is to trigger its activity. For example, one WTRU should know that the third position in the bitmap is an indication for that WTRU. Whether the HARQ processes are on or off can be signaled along with the RB assignment. The timing from which transmission time interval (TTI) the WTRU should read this information is also included. Beginning from the signaled TTI, the WTRU reads the content from the signaled position to obtain the necessary information.

Figure 1:
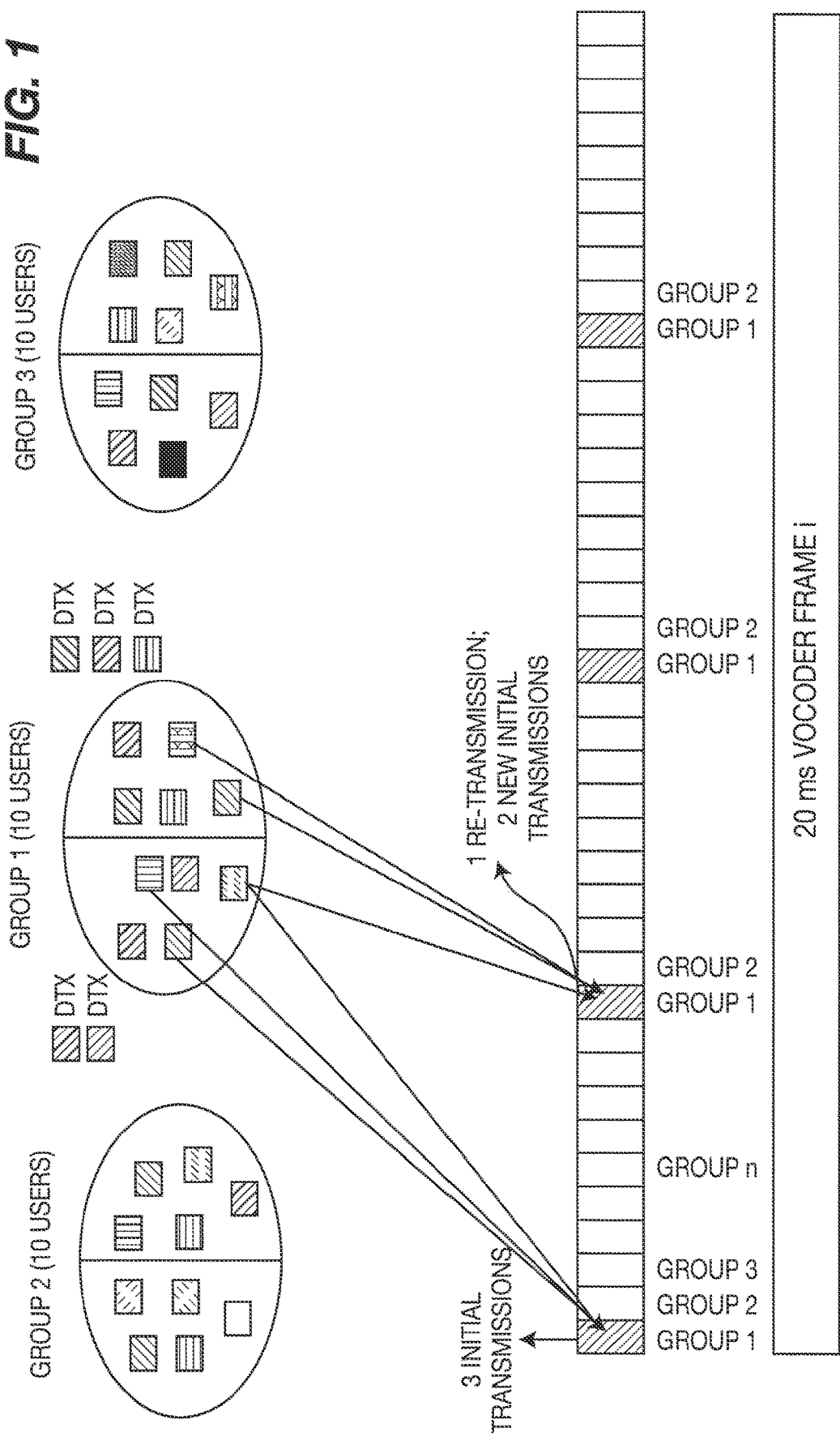
FIG. 1 shows a 20 ms resource allocation with assignments for UEs in a single group.
Figure 2:
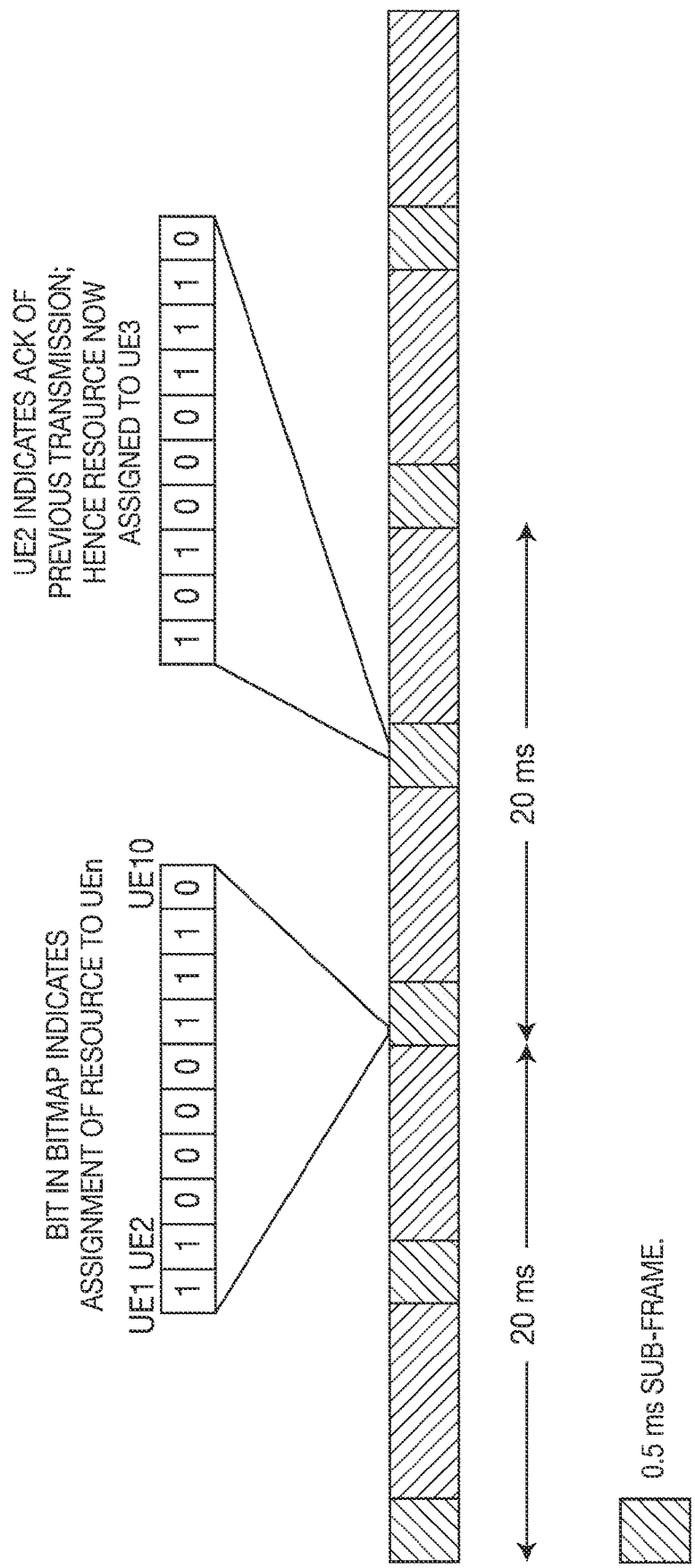
FIG. 2 shows a radio resource assignment using a bitmap based on a UE grouping.
Figure 3:
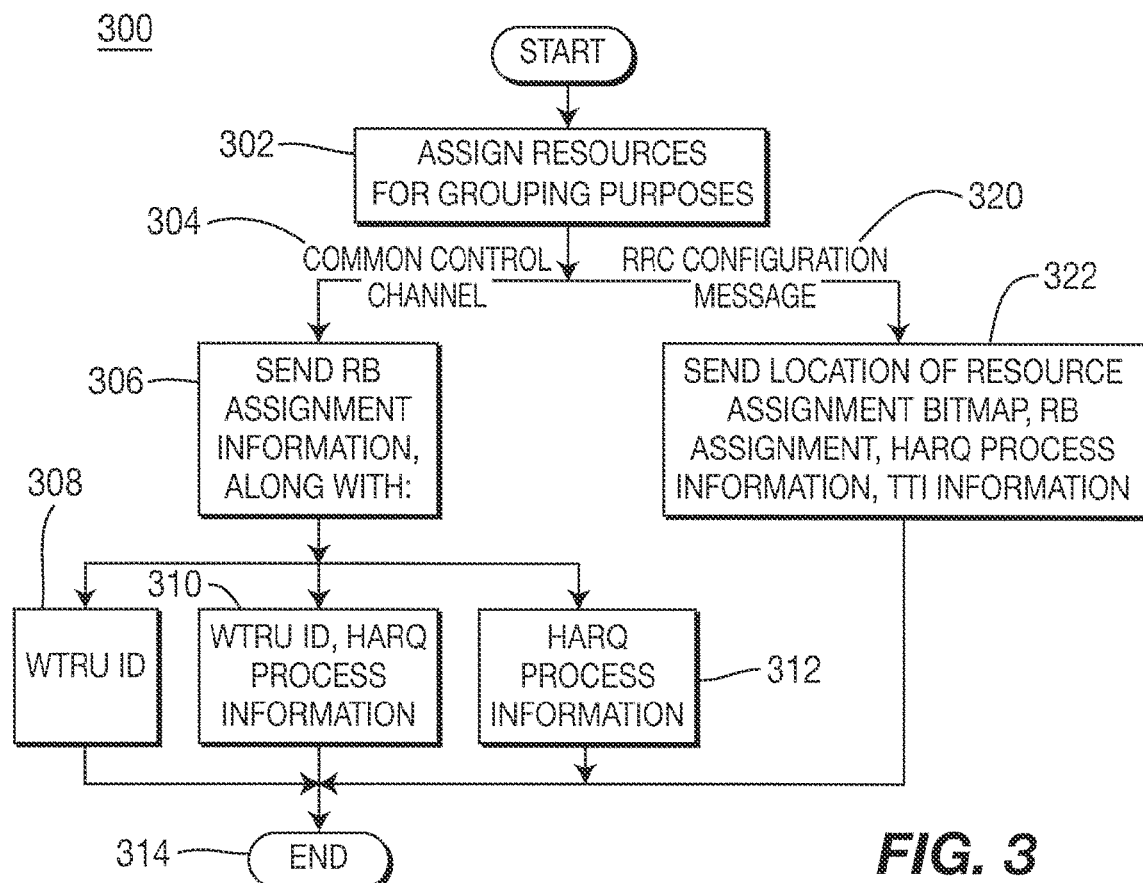
FIG. 3 is a flowchart of a method for signaling for grouping services.

FIG. 3 is a flow diagram of a method 300 for signaling for grouping services. The eNB assigns resources to the WTRUs for grouping purposes (step 302). As noted above, there are two different ways to communicate the resource assignments from the eNB to the WTRUs: over a common control channel and by an RRC configuration message. If the common control channel is used (step 304), the RB assignment information is sent (step 306) along with one or more pieces of information: the WTRU ID (step 308), the WTRI ID and HARQ process information (step 310), or HARQ process information (step 312). After sending the resource assignment information, the method terminates (step 314).

If the resource assignment information is sent by an RRC configuration message (step 320), the eNB sends the location of the resource assignment bitmap, the RB assignment, HARQ process information, and TTI information to the WTRUs (step 322). After sending the resource assignment information, the method terminates (step 314).

Deactivation and re-assignment of radio resources can also be done through an RRC message to the WTRU. When deactivating resources, the eNB provides an indication to the WTRU that the grouping period is done. When reassigning resources, an RRC message contains the new radio resource allocation message.

Voice Activity Report in UL

In a second embodiment, the UL includes a WTRU's voice activity report. In DL, the eNB can detect the voice state transition between the silent state and the active state using a voice codec with a voice activity/silence detector, or just monitor missing voice data and/or silence indication packets. After the detection, the eNB can efficiently assign radio resources from the WTRUs that are in the silent state to other WTRUs that are in the active state. The new resource assignment is signaled to the WTRUs from the eNB.

Figure 4:
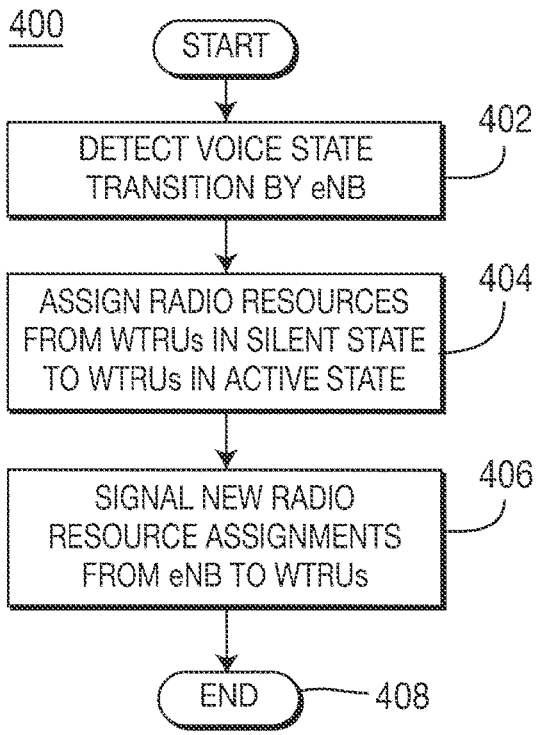
FIG. 4 is a flowchart of a method for reassigning resources based on a DL voice activity report.

FIG. 4 is a flowchart of a method 400 for reassigning resources based on a DL voice activity report. The eNB detects a voice state transition by the WTRU (step 402). The eNB assigns radio resources from WTRUs that are in the silent state to WTRUs that are in the active state (step 404). The eNB signals new radio resource assignments to the WTRUs (step 406) and the method terminates (step 408).

Re-allocation of UL resources is also scheduled and assigned by the eNB. To be able to do so, the eNB needs to have knowledge of the active/silent voice state transition of each WTRU, so that it can assign the resources that are not used due to a WTRU being in a silent period to other voice users or other services. The new resource assignment decision should be signaled to the WTRUs in a timely manner. The voice activity transition on the UL can only be detected at a WTRU, so the detection of the voice activity transition should be efficiently and immediately reported to the eNB.

Figure 5:
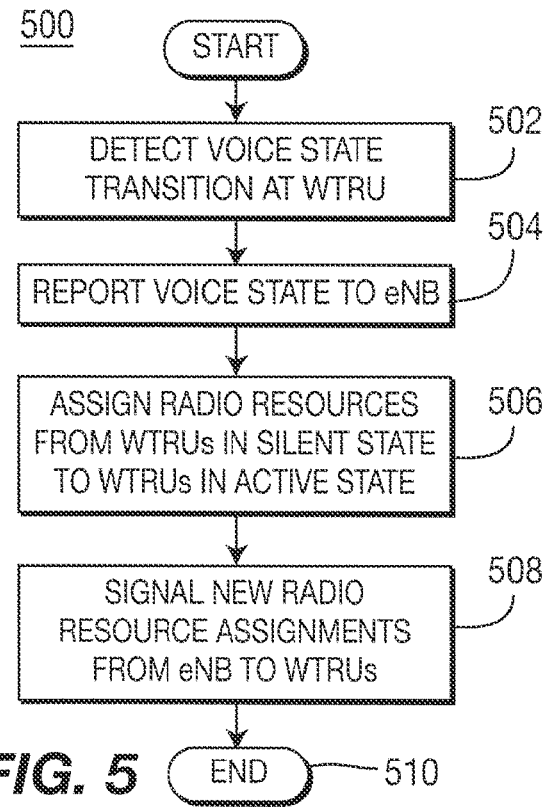
FIG. 5 is a flowchart of a method for reassigning resources based on a UL voice activity report.

FIG. 5 is a flowchart of a method 500 for reassigning resources based on a UL voice activity report. The voice state transition is detected at the WTRU (step 502) and is reported to the eNB (step 504). The eNB assigns radio resources from WTRUs that are in the silent state to WTRUs that are in the active state (step 506). The eNB signals new radio resource assignments to the WTRUs (step 508) and the method terminates (step 510).

The following options are proposed to report voice on-off activity in the UL. In a first embodiment, a one bit status report is added to indicate voice on-off activity from the WTRU, and is used only when voice activity transits between the on and off states. There are several options to realize this reporting in the UL.

(1) L1 signaling options for activation include:

(a) Using physical control signaling, which could be multiplexed with other UL L1 signalings such as HARQ, ACK/NAK, CQI, etc. For example, a bit value of one (1) is used to indicate the active state and a bit value of zero (0) is used to indicate silent state or vice versa with single bit signaling. Preferably, the control signaling parameter is multi-purpose, providing a general indication that a known physical channel allocation should be established/maintained or released.

(b) Use of an UL periodic dedicated channel. The voice activity change indication can be sent from the UL periodic dedicated channel if no other channels are available. This indication is important when the WTRU voice activity transits from off to on, which requires the WTRU to report to the eNB as soon as possible, so that the eNB can quickly assign the UL resources to the WTRU for its UL voice service.

(c) Use of a synchronous RACH, where the voice activity change indication is sent on the synchronous RACH, which has a small access delay.

(2) L1 signaling for deactivation can be in associated signaling of the last data packet, for a predetermined (configured or specified) repetition pattern following the last data packet on a synchronous PRACH or UL periodic dedicated channel, or with no UL data packet transmitted.

(3) L2/L3 signaling options include the following:

(a) Adding an indication in the MAC header, which could be a variant of other UL buffer occupancy signaling.

(b) Adding an indication to be piggybacked with an UL L2 packet, which can be used if a piggybacked packet will not cause a long delay. A short delay is important when the WTRU transits from the silent state to the active state, because it requires an immediate resource allocation from the eNB.

(c) Sending a new MAC control packet.

(d) Adding an indication within RLC status reports from the WTRU, with the same short delay requirement as using the piggyback feedback option.

(e) Adding an indication to existing RRC signaling, with the same short delay requirement as using the piggyback feedback option.

(f) Adding an indication to a scheduling information (SI) message or to a buffer size message.

Depending on its location (L1 or L2/L3), the one bit indicating the voice on-off status report is protected either by repetition coding or by a CRC in order to minimize the probability of it being misinterpreted. Because if the status report is erroneously received, the eNB risks taking a wrong decision, e.g., allocating or de-allocating resources when it should have not. The WTRU can detect if something erroneous has happened via a timer mechanism (e.g., it sent an indication that its voice state is active but never received an allocation) or via receiving an unexpected message (e.g., the WTRU receives a resource assignment message when its voice activity is silent, or it receives a resource de-allocation message when its voice activity is active). Upon detecting such an error, the WTRU can either re-send the voice activity status report or send another report to indicate that an error has occurred.

When the eNB detects the silent state from one WTRU, the resources for that WTRU can be allocated to other VoIP WTRUs, other services, or different WTRUs.

Two examples of ways to de-allocate a resource are described below:

(a) Upon signaling the silence indication, the WTRU can automatically (on its own) forfeit the resource, which can be efficient in the sense that the eNB can simply allocate the resource immediately to another WTRU.

(b) The WTRU does not forfeit the resource on its own, but rather waits to receive a resource de-allocation message from the eNB.

In the latter case, it is preferable to have a combined resource allocation message that can target more than one WTRU (e.g., two WTRUs). The combined message informs one WTRU that its UL resource has been de-allocated and informs another WTRU that it has been allocated an UL resource. This resource de-allocation signal is also used so that a misinterpreted UL activation/deactivation indication can be recognized and corrected by the WTRU.

In another method (not shown), the eNB can try to detect or predict voice activity in the UL, based on the DL voice activity for the user. The rationale is that there is a negative correlation between UL voice activity and DL voice activity, since most of the time (but not always 100% of the time) one person is talking (e.g., DL voice is active) while the other person is listening (e.g., UL voice is inactive). The eNB can make use of DL voice activity information for a particular user for increasing or decreasing the UL resources assigned, e.g., the eNB can analyze the voice activity in the DL and gradually increase or decrease the UL resources accordingly.

Figure 6:
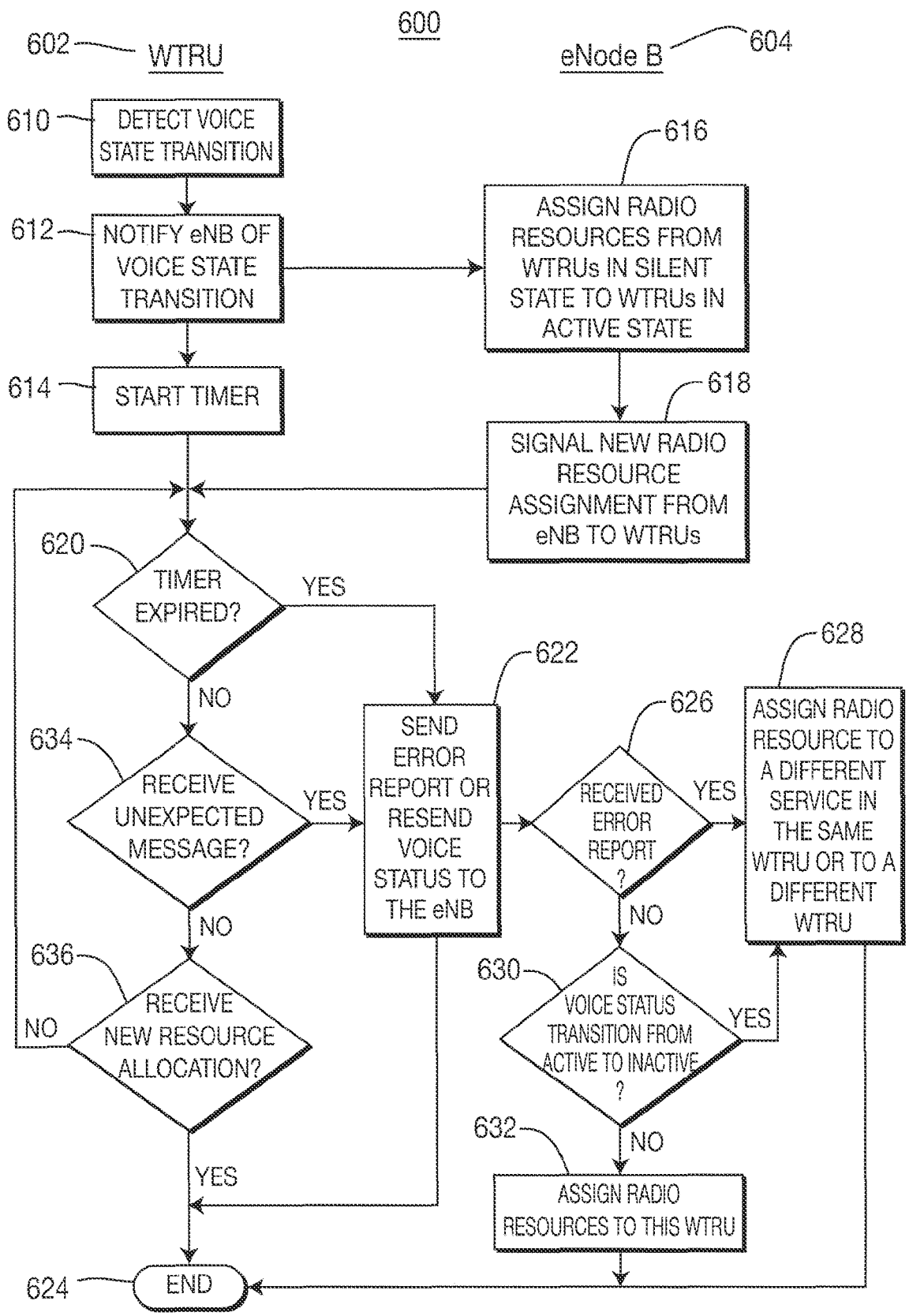
FIG. 6 is a flow diagram of a method for verifying a UL voice activity report in connection with reassigning resources.

FIG. 6 is a flow diagram of a method 600 for verifying a UL voice activity report in connection with reassigning resources between a WTRU 602 and an eNB 604. It is noted that while FIG. 6 shows only one WTRU, the principles of the method 600 apply to any number of WTRUs. The WTRU 602 detects an UL voice state transition between the active state and the silent state (step 610). The WTRU 602 notifies the eNB 604 of the voice state transition (step 612) and starts an internal timer (step 614).

The eNB 604 assigns radio resources from WTRUs that are in the silent state to WTRUs that are in the active state (step 616). The eNB 604 then signals the new radio resource assignments to the WTRU (step 618).

At the WTRU 602, a determination is made whether the timer has expired (step 620). If the timer has expired, then the WTRU 602 sends an error report to the eNB 604 or resends its voice status (step 622) and the method terminates (step 624). Sending an error report or resending the voice status is performed, as noted above, as a check whether the current voice state of the WTRU 602 was correctly reported.

At the eNB 604, a determination is made whether the WTRU 602 sent an error report (step 626). If the WTRU 602 sent an error report, the eNB 604 assigns the radio resource for the WTRU 602 to other services in the WTRU or to a different WTRU (step 628) and the method terminates (step 624). If the WTRU 602 did not send an error report (step 626), a check is made whether the voice status resent by the WTRU 602 is a transition from the active state to the inactive state (step 630). If the WTRU 602 has entered the inactive voice state, then the eNB 604 assigns the radio resource for the WTRU 602 to other services in the WTRU or to a different WTRU (step 628) and the method terminates (step 624). If the WTRU 602 has entered the active voice state (step 630), then the eNB 604 assigns radio resources to the WTRU 602 and the method terminates (step 624).

If the timer has not expired (step 620), then a check is made whether the WTRU 602 has received an unexpected message (step 634). If the WTRU 602 has received an unexpected message, then the WTRU 602 sends an error report to the eNB 604 or resends its voice status (step 622) and the method terminates (step 624).

If the WTRU 602 has not received an unexpected message (step 634), then a determination is made whether the WTRU 602 has received a new radio resource allocation from the eNB 604 (step 636). If the WTRU 602 has received a new radio resource allocation, then the method terminates (step 624). If the WTRU 602 has not received a new resource allocation (step 636), then this series of checks is repeated, starting from checking whether the timer has expired (step 620), as described above.

Pattern Variation of Allocated Radio Resources

In accordance with a third embodiment of the present invention, the order of the radio resource block assignment varies instead of being fixed, regardless if WTRU grouping is used or not. Varying radio resource block assignment avoids assigning the same radio resource block to a specific WTRU that may encounter an adverse bursty channel condition. For example in WTRU grouping, if there are users numbered from 1 to 10 and WTRUs 1, 3, 4, and 7 are in the bitmap, this means that WTRU 1 is always assigned to radio resource block X (assuming that the radio resource blocks are enumerated) and this assignment cannot adapt to channel variations.

In this embodiment, the radio resource block assignment is randomized for persistent voice users and even within the WTRU grouping. The randomization can be dynamic or semi-static based on the system configuration, performance requirements, or measurement results. The eNB decides which scheme to use. The proposed options are described as follows:

(1) Randomization of the radio resource block assignment can be realized by a pseudorandom function iterated by the radio resource block numbers or the frame numbers. Selection of the pseudorandom function is an implementation decision, because an "optimal" function is best selected based on simulation results, which in turn are based on network specifics and as such, will vary from network to network. The permutation of radio resource blocks can be configured to a predefined period. It is noted that the length of the predefined period depends on the buffer occupancy and the length of service that is expected. The parameters used in the pseudorandom function should also be configurable.

(2) Randomization of the radio resource block assignment can also be realized by applying frequency hopping with a known pattern. Selection of the pattern is an implementation decision, because an "optimal" pattern is best selected based on simulation results, which in turn are based on network specifics and as such, will vary from network to network. The frequency hopping pattern should be configurable and signaled to the WTRUs. The frequency hopping can be configured to a predefined period.

(3) Based on the channel quality measured at the WTRU, the WTRU reports the preferred radio resource block in terms of the measurement results at the WTRU. Except for the channel quality indicator (CQI), the WTRU can report the preferred resource allocation to the eNB by indicating the radio resource block IDs. The eNB makes the final scheduling decision by considering the WTRU's recommendation and other factors, including, but not limited to, cell load condition, interference level, other WTRU's service requests, and service priorities, comprehensively.

In order to signal the dynamic or semi-static resource scheduling as described above, explicit signaling is preferable. Thus, the following methods are applied. In a first method, single bit signaling is replaced with multiple bit signaling in the bitmap per WTRU to achieve the randomness of resource allocation. In a second method, the number of signaling bits per WTRU can be variable. These signaling bits should at least signal the following information to the WTRUs within a group: (a) the voice silent/active state; (b) the resource block assignment if there is a change from the initial or previous allocation; and (c) if an asynchronous HARQ scheme is used, then the HARQ ID and the resource sequence number (RSN) need to be signaled if association of the HARQ process to the radio resource block changes.

It is further proposed that a dynamic switch occurs between the common and dedicated control channels. For example, the control information such as the RB assignment and the HARQ process information can be either in the common control channel or the dedicated control channel. This depends on the size of the information that is inside the common control channel. For example, if a large number of WTRUs are to be in one group (e.g., over one hundred), then there may be too much scheduling information contained inside the common control channel, which would exceed the control channel's capacity. The control information to indicate the switch is either signaled in the common control part or through RRC configuration.

Efficient and Flexible Voice User Multiplexing

According to a fourth embodiment of the present invention, statistical multiplexing of voice users is performed according to the cell voice traffic volume. The number of voice users to be multiplexed should be greater than a threshold so that the VAF is a statistical average number. The number of voice users within a multiplexing group varies according to the traffic volume and the channel quality, so that the size of the bitmaps of different WTRU groups may be different. If the number of active voice users within one multiplexing group exceeds the available radio resources within one group at an instant in time, the eNB can schedule radio resources from other WTRU groups that may not use their full allocated radio resources.

System to Check Voice State and Assign Radio Resources

Figure 7:
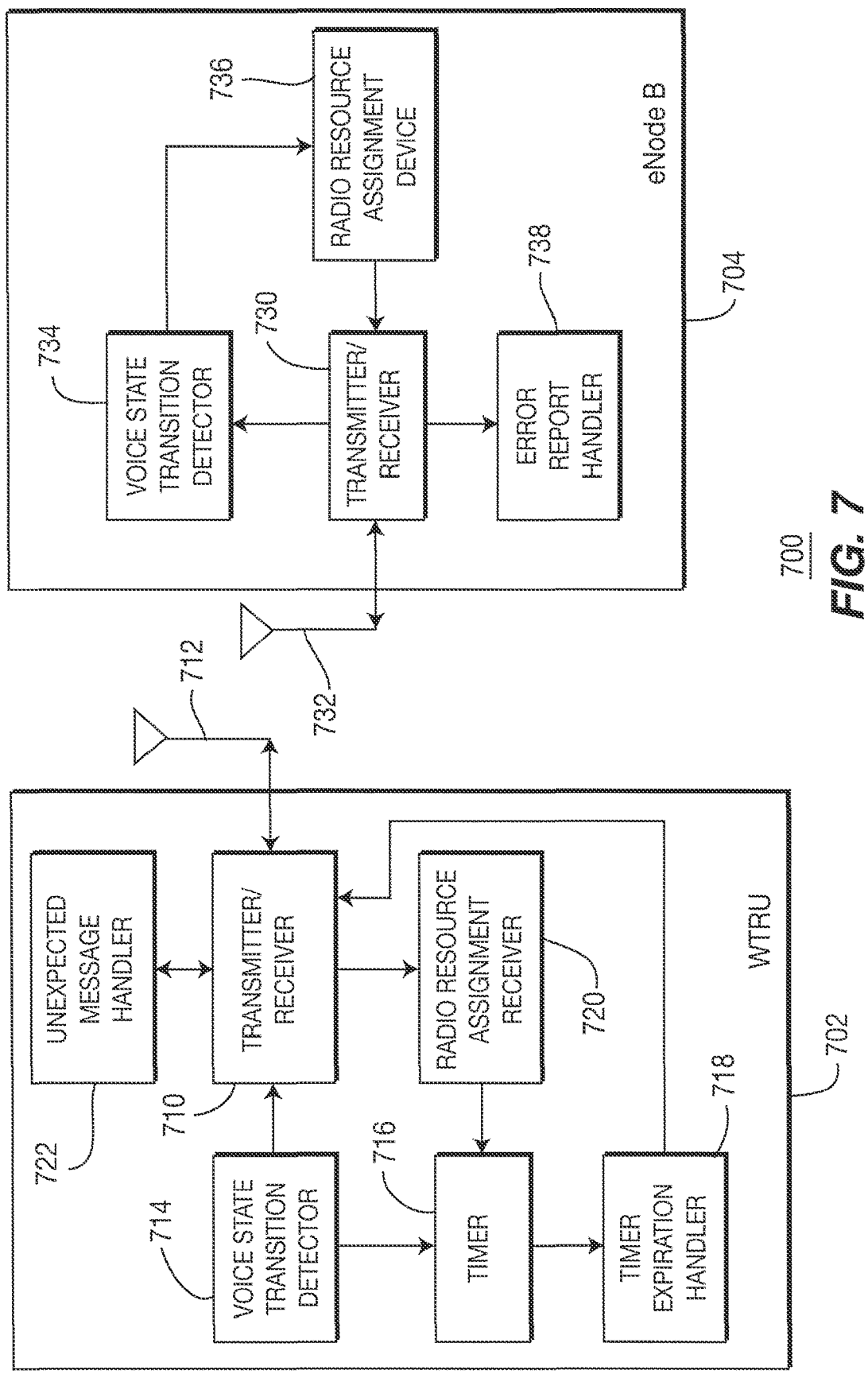
FIG. 7 is a diagram of a system constructed to check voice state activity and to assign radio resources.

FIG. 7 is a diagram of a system 700 constructed to check voice state activity and to assign radio resources. The system 700 includes a WTRU 702 and an eNB 704. The WTRU 702 includes a transmitter/receiver 710 and an antenna 712 connected to the transmitter/receiver 710. A voice state transition detector 714 communicates with the transmitter/receiver 710 and a timer 716. The timer 716 communicates with a timer expiration handler 718, which in turn communicates with the transmitter/receiver 710. A radio resource assignment receiver 720 communicates with the transmitter/receiver 710 and the timer 716. An unexpected message handler 722 communicates with the transmitter/receiver 710.

The eNB 704 includes a transmitter/receiver 730 and an antenna 732 connected to the transmitter/receiver 730. A voice state transition detector 734 communicates with the transmitter/receiver 730 and a radio resource assignment device 736, which in turn communicates with the transmitter/receiver 730. An error report handler communicates with the transmitter/receiver 730 and the radio resource assignment device 736.

In operation, the system 700 can perform the methods 400, 500, and 600 described above. In regard to the method 400, the voice state transition detector 734 in the eNB 704 detects when the WTRU 702 changes between the voice active state and the voice silent state. The voice state transition detector 734 informs the radio resource assignment device 736 of the voice state change, and the radio resource assignment device 736 assigns or reassigns radio resources as needed from WTRUs in the silent state to WTRUs in the active state. The new radio resource assignments are forwarded to the transmitter/receiver 730 which sends the new radio resource assignments to the WTRU 702.

In regard to the method 500, the voice state transition detector 714 in the WTRU 702 detects when the WTRU 702 changes between the voice active state and the voice silent state. The voice state is forwarded to the transmitter/receiver 710 which reports the voice state to the eNB 704. At the eNB 704, the transmitter/receiver 730 receives the voice state of the WTRU 702 and forwards it to the voice state transition detector 734. The voice state transition detector 734 informs the radio resource assignment device 736 of the voice state change, and the radio resource assignment device 736 assigns or reassigns radio resources as needed from WTRUs in the silent state to WTRUs in the active state. The new radio resource assignments are forwarded to the transmitter/receiver 730 which sends the new radio resource assignments to the WTRU 702.

In regard to the method 600, the voice state transition detector 714 in the WTRU 702 detects when the WTRU 702 changes between the voice active state and the voice silent state. The voice state is forwarded to the transmitter/receiver 710 which reports the voice state to the eNB 704. At the eNB 704, the transmitter/receiver 730 receives the voice state of the WTRU 702 and forwards it to the voice state transition detector 734. The voice state transition detector 734 informs the radio resource assignment device 736 of the voice state change, and the radio resource assignment device 736 assigns or reassigns radio resources as needed from WTRUs in the silent state to WTRUs in the active state. The new radio resource assignments are forwarded to the transmitter/receiver 730 which sends the new radio resource assignments to the WTRU 702.

The voice state transition detector 714 also informs the timer 716, which begins to run. If the timer 716 expires, the timer informs the timer expiration handler 718, which sends an error report or resends the voice status to the eNB 704 via the transmitter/receiver 710. If the eNB 704 receives an error report, it is passed from the transmitter/receiver 730 to the error report handler 738, which in turn informs the radio resource assignment device 736. The radio resource assignment device 736 assigns the radio resource to a different service in the same WTRU 702 or assigns the radio resource to a different WTRU. This new radio resource assignment is forwarded to the transmitter/receiver 730 which sends the new radio resource assignments to the WTRU 702.

If the eNB receives a resent voice status, it is forwarded to the voice state transition detector 734. If the resent voice status indicates that the WTRU 702 is in the silent state, the voice state transition detector 734 informs the radio resource assignment device 736. The radio resource assignment device 736 assigns the radio resource to a different service in the same WTRU 702 or assigns the radio resource to a different WTRU. This new radio resource assignment is forwarded to the transmitter/receiver 730 which sends the new radio resource assignments to the WTRU 702.

If the timer 716 has not expired and the WTRU 702 receives an unexpected message, the unexpected message handler 722 sends an error report or resends the voice status to the eNB 704 via the transmitter/receiver 710. The eNB handles the error report or the resent voice status as described above. If the timer 716 has not expired and the WTRU 702 receives a new radio resource allocation, the radio resource assignment receiver 720 informs the timer 716, which then stops.

The present invention may be implemented in any type of wireless communication system or network, as desired, particularly in the WTRU, base station, or eNB. By way of example, the present invention may be implemented in any type of IEEE 802 type system, wideband code division multiple access (WCDMA), universal mobile telecommunications system (UMTS)-frequency division duplex (FDD), UMTS-time division duplex (TDD), time division synchronous code division multiple access (TDSCDMA), orthogonal frequency division multiplexing (OFDM)-multiple input multiple output (MIMO), or any other type of wireless communication system. The present invention may also be implemented on a digital signal processor (DSP); software; hardware; an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s). The present invention is preferably implemented at the physical layer (radio or digital baseband), data link layer, or network layer.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method performed by a first wireless transmit/receive unit (WTRU), the method comprising:
    receiving a radio resource control (RRC) message, wherein the RRC message indicates a set of resource blocks and includes information to determine at least one location within the set of resource blocks, the set of resource blocks including a plurality of locations indicating time-frequency orthogonal frequency division multiplex (OFDM) resource assignments for a plurality of WTRUs including the first WTRU;
    processing at least one location within the set of resource blocks for one or more resource assignment messages for the first WTRU, wherein a first resource assignment message of the one or more resource assignment messages is associated with a persistent allocation of resources and indicates activation of a resource;
    transmitting a plurality of uplink signals in a plurality of time intervals based on the indicated activation of the resource;
    processing at least one location within the set of resource blocks, in a subsequent time interval than the set of resource blocks having the first resource assignment message, for one or more resource assignment messages including a second resource assignment message for the first WTRU, wherein the second resource assignment message indicates deactivation of the resource;
    deactivating the transmitting of the plurality of uplink signals of the resource based on the indicated deactivation; and
    receiving at least a third resource assignment message for the first WTRU, wherein the third resource assignment message changes a resource assignment associated with the first WTRU having the persistent allocation of resources.

2. The method of claim 1, wherein the one or more resource assignment messages are derived from an uplink resource block assignment and a WTRU identity.

3. The method of claim 2, wherein the one or more resource assignment messages include HARQ process information.

4. The method of claim 1, further comprising receiving a signal and determining a subset of the plurality of locations within the indicated set of resource blocks for the first WTRU based on the received signal.

5. The method of claim 1, wherein the plurality of WTRUs are grouped based on their respective channel conditions.

6. A wireless transmit/receive unit (WTRU) comprising:
    a transceiver; and
    a processor,
    wherein the transceiver and the processor are configured to cause the WTRU to:
    receive a radio resource control (RRC) message, wherein the RRC message indicates a set of resource blocks and includes information to determine at least one location within the set of resource blocks, the set of resource blocks including a plurality of locations indicating time-frequency orthogonal frequency division multiplex (OFDM) resource assignments for a plurality of WTRUs including the WTRU;
    process at least one location within the set of resource blocks for one or more resource assignment messages for the WTRU associated with a persistent allocation of resources, wherein a first resource assignment message of the one or more resource assignment messages indicates activation of a resource;
    transmit a plurality of uplink signals in a plurality of time intervals based on the indicated activation of the resource;
    process at least one location within the set of resource blocks, in a subsequent time interval than the set of resource blocks having the first resource assignment message, for one or more resource assignment messages including a second resource assignment message for the WTRU, wherein the second resource assignment message indicates deactivation of the resource;
    deactivate the transmitting of the plurality of uplink signals of the resource based on the indicated deactivation; and
    receive at least a third resource assignment message for the WTRU, wherein the third resource assignment message changes a resource assignment associated with the persistent allocation of resources.

7. The WTRU of claim 6, wherein the one or more resource assignment messages are derived from an uplink resource block assignment and a WTRU identity.

8. The WTRU of claim 7, wherein the one or resource assignment messages include HARQ process information.

9. The WTRU of claim 6, wherein the transceiver and the processor are further configured to cause the WTRU to receive a signal and determining a subset of the plurality of locations within the indicated set of resource blocks for the WTRU based on the received signal.

10. The WTRU of claim 6, wherein the plurality of WTRUs are grouped based on their respective channel conditions.

\* \* \* \* \*